United States Patent
Dittlo et al.

(10) Patent No.: US 7,643,692 B2
(45) Date of Patent: Jan. 5, 2010

(54) METHOD AND SYSTEM OF GENERATING GEOMETRIC CHARACTERISTICS OF A DIGITALLY ENCODED IMAGE

(75) Inventors: Nicolas Dittlo, Bordeaux (FR); Sébastien Amyot, Bordeaux (FR)

(73) Assignee: Decopole, Cenon (FR)

( * ) Notice: Subject to any disclaimer, the term of this patent is extended or adjusted under 35 U.S.C. 154(b) by 747 days.

(21) Appl. No.: 11/448,176

(22) Filed: Jun. 6, 2006

(65) Prior Publication Data

US 2007/0014487 A1    Jan. 18, 2007

(30) Foreign Application Priority Data

Jun. 8, 2005    (FR)    ................... 05 05835

(51) Int. Cl.
*G06K 9/36* (2006.01)
(52) U.S. Cl. .................. 382/243; 382/234; 382/235
(58) Field of Classification Search .............. 382/234, 382/235, 243
See application file for complete search history.

(56) References Cited

U.S. PATENT DOCUMENTS

| | | | |
|---|---|---|---|
| 5,537,638 A | 7/1996 | Morita et al. | |
| 6,277,074 B1 * | 8/2001 | Chaturvedi et al. | 600/437 |
| 6,331,858 B2 | 12/2001 | Fisher | |
| 6,987,890 B2 * | 1/2006 | Joshi et al. | 382/240 |
| 7,006,881 B1 * | 2/2006 | Hoffberg et al. | 700/83 |
| 7,310,597 B2 * | 12/2007 | Chamberlain | 704/222 |

FOREIGN PATENT DOCUMENTS

| | | |
|---|---|---|
| DE | 19839397 | 3/2000 |
| GB | 2404512 | 2/2005 |
| WO | 94/20923 | 9/1994 |

OTHER PUBLICATIONS

French Search Report No. 0505835 for French Application No. 667753 mailed Apr. 25, 2006, 1 page.

* cited by examiner

*Primary Examiner*—Yosef Kassa
(74) *Attorney, Agent, or Firm*—Meyertons, Hood, Kivlin, Kowert & Goetzel, P.C.; Eric B. Meyertons

(57) ABSTRACT

The system of generating geometric characteristics of a digitally encoded image comprises a display device (2) capable of displaying a digitized image, communicating with a control unit (4), and comprising a man-machine interface (6) and means of supplying data (3) to the system via said man-machine interface (6). The system also comprises:

- a display means (7) for displaying a digitally encoded image on the display device (2),
- a first delimiting means (8) for delimiting a portion of the image representing a substantially flat surface,
- a processing means (9) for applying a predetermined deformable geometric pattern to the image in the position of said delimited image portion and deforming the pattern so as to make it correspond to said image portion, and
- a determination means (10) for determining geometric characteristics of said surface from the deformation of the pattern.

27 Claims, 16 Drawing Sheets

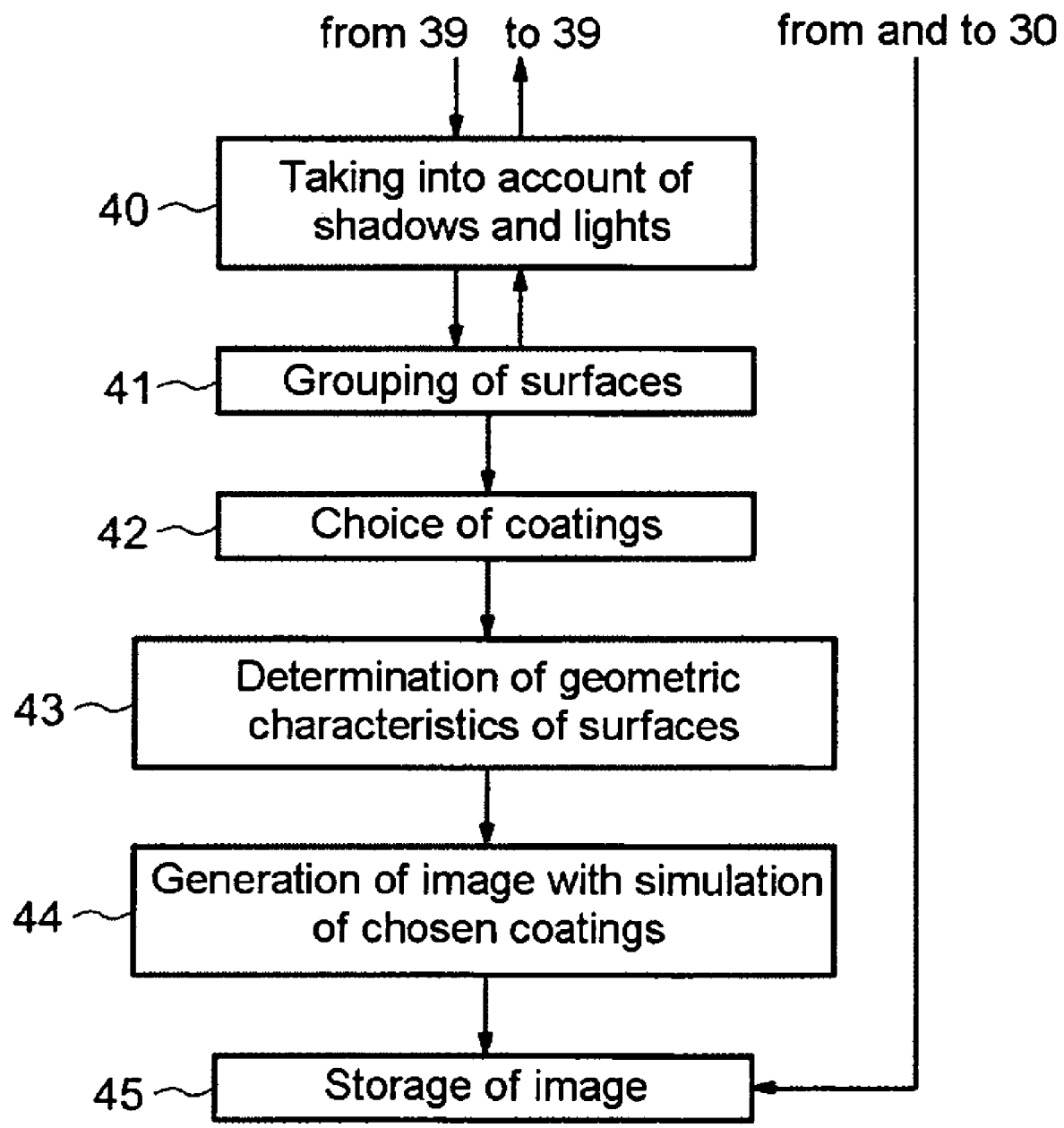

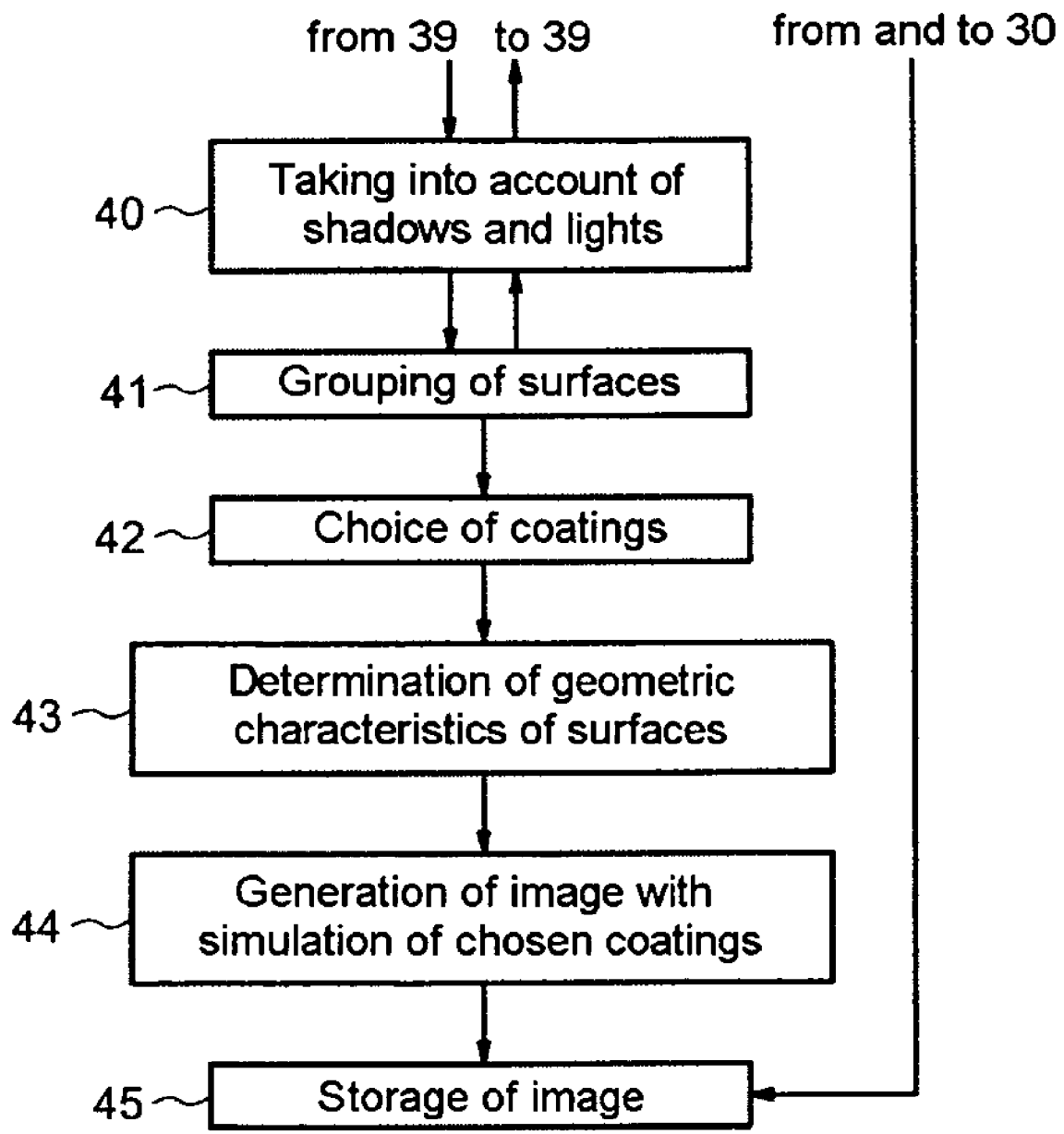

METHOD AND SYSTEM OF GENERATING GEOMETRIC CHARACTERISTICS OF A DIGITALLY ENCODED IMAGE

The present invention relates to the generation of geometric characteristics of a digitally encoded image, and more particularly to a method and a system of generating geometric characteristics of a digital image to allow changes of surface coatings to be simulated on the image.

There are methods implemented by computers that allow changes of surface coatings to be simulated from a digitally encoded image. Such methods are normally restrictive, because they entail lengthy preparatory work to create a specific image including reference elements enabling the geometric characteristics of the image to be deduced.

In this respect, reference can be made to the document GB 2 404 512 which discloses a method implemented by computer to determine geometric characteristics of an image. The image must originate from a photograph taken by positioning, in an accurate and predetermined way, reference elements in the form of patterns on different flat surfaces to be photographed, normally walls, floors or ceilings of rooms. The rendition in the image of these elements and the knowledge of the dimensions of the elements makes it possible, according to the method implemented, to extract geometric characteristics of the image, in order to be able subsequently to simulate different coatings on the surfaces of the room in the image.

Such a method is difficult to implement by an unskilled user, and requires lengthy preparation work in order to obtain an image that can be modified by changing, for example, the coatings of certain surfaces.

Furthermore, the relative small size of the reference elements placed on the surfaces to be photographed leads to a lack of accuracy in the extraction of the geometric characteristics.

The invention therefore seeks to remedy these drawbacks, and proposes to determine geometric characteristics of a digitally encoded image, without requiring preliminary processing of the surfaces when photographing surfaces on which there is a desire to simulate another coating.

Thus, there is proposed, according to one aspect of the invention, a method of generating geometric characteristics of a digitally encoded image. According to this method, the image is displayed, and a portion of the image is delimited, representing a substantially flat surface. A predetermined deformable geometric pattern is then applied to the image in the position of said delimited image portion, the pattern is deformed so as to make it correspond to said image portion, and geometric characteristics of said surface are determined from the deformation of the pattern.

There is therefore no need to perform lengthy surface preparation operations before taking a photograph to be used as a basis for the digitized image.

The geometric characteristics are determined from the deformation of the geometric patterns mapped to the different surfaces.

Furthermore, the accuracy of the geometric data extracted is enhanced.

The geometric characteristics include in particular the angles formed by two pairs of straight lines of the image, respectively representative of two pairs of straight lines that are parallel in reality, the direction of the straight lines of one pair being perpendicular to the direction of the straight lines of the other pair. The geometric characteristics also include the scale ratios between the actual sizes of the elements and their size on the image.

In a preferred embodiment, a coating is selected from a set of coatings stored in a database, and an image is generated of said surface covered by said coating according to the geometric characteristics of the surface.

It is possible to simulate changes of surface coatings, and to display the result immediately. It is then easy to choose the coatings to be placed on the surfaces, such as wood floors, paints or wallpapers.

The invention makes it possible, from a simple digitally encoded photograph, to immediately display an unlimited number of changes of decoration of a room, and thus to be able to choose the decoration of choice for that room.

Naturally, the invention applies to the interior surfaces of a room as well as to the exterior surfaces of a building.

Advantageously, the pattern is a grid comprising a criss-cross pattern of a predetermined set of rows and columns of individual squares of predetermined surface.

Such a pattern is simple, easy to manipulate, and facilitates geometrical data computations.

In a first embodiment, for each of the two directions of said image portion representing said surface, the actual size of an element of said surface displayed according to an axis of the superimposed grid is indicated.

This makes it possible to indicate accurately distances according to the two axes of the grid, and thus to determine the other necessary distances, according to both axes.

In a second embodiment, the number of rows and columns of the grid is adapted according to the size of a side of an individual square of the grid and the dimensions of said surface.

There are then indicated, in a different way, the distances according to the two axes of the grid, in order to make it possible to determine the other necessary distances, according to both axes.

Advantageously, one or more portions of said image are delimited, corresponding to the representation of objects located in front of said surface.

Thus, the change of coating will not be applied to these elements, which are located in front of the surface for which there is a desire to simulate a change of coating.

Furthermore, a zoom is used to refine the delimiting of said portions of said image corresponding to the representation of said objects located in front of said surface and/or the delimiting of said portion of said image representing said surface.

The zoom is used to define more clearly the outlines of objects and surfaces, in order to obtain a more accurate result.

Furthermore, the geometric patterns respectively superimposed on a plurality of portions of the image representing substantially flat surfaces are adjusted.

The geometric patterns are accurately adjusted, manually or automatically, to the respective image portions. Furthermore, when two surfaces on which there is a desire to simulate another coating meet on a common side, the geometric patterns are automatically adjusted so that, when the new image is generated, the two respective coatings of the surfaces meet perfectly.

Advantageously, the respective positions of said delimited image portions are pre-displayed and/or the respective positioning of the geometric patterns is pre-displayed.

Such a pre-display makes it possible to check the respective positioning of the cut out image portions, before starting the simulation process. It is also possible to check the correct positioning of the geometric patterns on the image portions corresponding to the flat surfaces.

Furthermore, it is possible to define the respective positions of said delimited image portions.

This makes it possible to define the positioning of elements of the image relative to each other.

It is also possible to group a number of delimited portions of the image representing substantially flat surfaces, to generate an image of said grouped surfaces covered simultaneously by one and the same selected coating.

By being able to group or separate a set of delimited portions of the image it becomes possible to choose a coating common to a group of surfaces and to simulate it on all these surfaces at one and the same time.

Advantageously, the shadows and lights present on said surfaces are taken into account, and said shadows and lights are restored on the generated images comprising the surfaces covered by respective coatings, taking into account said coating.

It is then possible to display the effects of the lighting on the simulated coating.

In a preferred embodiment, unprocessed images, images comprising said delimited portions and images with simulated surfaces covered by a coating are memorized.

It is possible to memorize all the images, in order to be able to have them available when necessary, and thus avoid recommencing work that has already been done before.

According to another aspect of the invention, there is also proposed a computer program stored on a data storage medium, which comprises instruction codes suitable for implementing a method as described previously, when executed in a computation module.

There is also proposed, according to another aspect of the invention, a system of generating geometric characteristics of a digitally encoded image comprising a display device capable of displaying a digitized image, communicating with a control unit, and comprising a man-machine interface and means of supplying data to the system via said man-machine interface. The system comprises a display means for displaying a digitally encoded image on the display device, and a first delimiting means for delimiting a portion of the image representing a substantially flat surface. The system also comprises a processing means for applying a predetermined deformable geometric pattern to the image in the position of said delimited image portion and deforming the pattern so as to make it correspond to said image portion, and a determination means for determining geometric characteristics of said surface from the deformation of the pattern.

Advantageously, the system also comprises a selection means for selecting a coating from a set of coatings stored in a database, and a generation means for generating an image of said surface covered by said coating according to the geometric characteristics of the surface.

In a preferred embodiment, the processing means is suitable for applying a grid comprising a criss-cross pattern made up of a predetermined set of rows and columns of individual squares of predetermined surface.

In a first embodiment, the system comprises an indication means for indicating the actual size of an element of said surface displayed according to an axis of the superimposed grid, for each of the two dimensions of said image portion representing said surface.

In a second embodiment, the system comprises an adaptation means, for adapting the number of rows and columns of the grid according to the size of a side of an individual square of the grid and the dimensions of said surface.

Advantageously, the system comprises a second delimiting means for delimiting one or more portions of said image corresponding to the representation of objects located in front of said surface.

In a preferred embodiment, the system comprises a zoom means for refining the delimiting of said portions of said image corresponding to the representation of said objects located in front of said surface and/or the delimiting of said portion of said image representing said surface.

In an advantageous embodiment, the system comprises an adjustment means for adjusting the geometric patterns respectively superimposed on a plurality of portions of the image representing substantially flat surfaces.

In a preferred embodiment, the system comprises a pre-display means for pre-displaying the respective positions of said delimited image portions.

Furthermore, the system comprises a means of modifying the respective positions of said delimited image portions.

Advantageously, the system comprises a grouping means for grouping a number of delimited portions of the image representing substantially flat surfaces. Said generation means is capable of generating an image of said grouped surfaces simultaneously covered by one and the same selected coating.

In a preferred embodiment, the system comprises a masking means for taking into account the shadows and lights present on said surfaces, and restoring said shadows and lights on the generated images comprising the surfaces covered by respective coatings, taking into account said coating.

Furthermore, the system comprises a memorizing means for memorizing unprocessed images, images comprising said delimited portions and images with simulated surfaces covered by a coating.

Other objects, characteristics and advantages of the invention will become apparent from reading the description that follows, given purely as a non-limiting example, and made with reference to the appended drawings in which:

FIGS. 3a and 3b illustrate a first way of implementing a method according to one aspect of the invention;

FIGS. 4a and 4b illustrate a second way of implementing a method according to one aspect of the invention.

Figure 1:
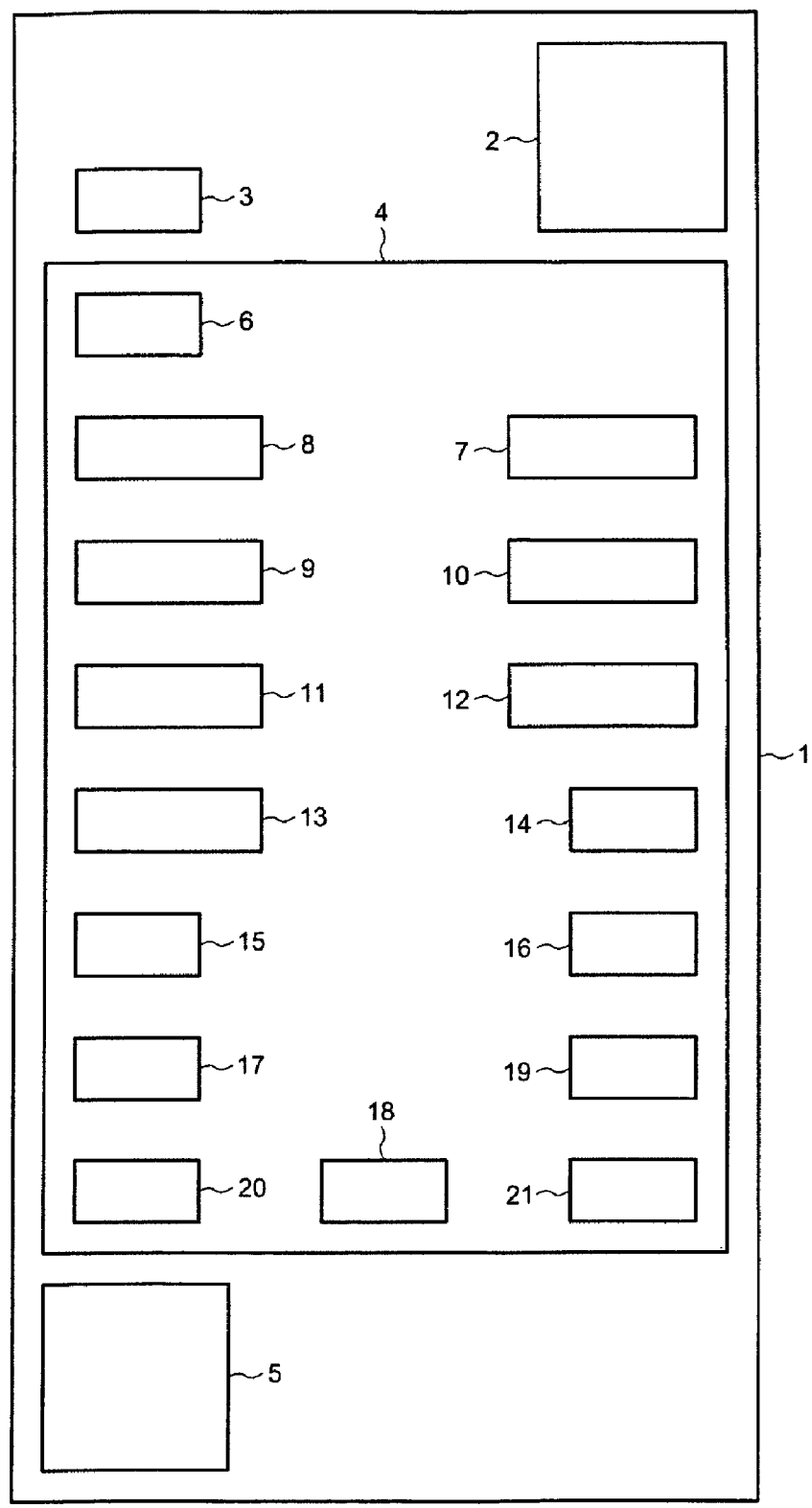
FIG. 1 is a block diagram illustrating a first embodiment of a system according to the invention.

As can be seen in FIG. 1, the system 1 comprises a display device 2, for example a screen. A module for supplying data 3, comprising, for example, a keyboard or a mouse, enables a user to supply data to the system 1.

The system 1 also comprises a control unit 4 and a database 5 of predetermined patterns corresponding to coatings that there is a desire to simulate on portions of a digitally encoded image, representing substantially flat surfaces.

The control unit 4 comprises a man-machine interface 6, processing in particular the data supplied by the module for supplying data 3, generally via a computer keyboard or mouse.

The control unit 4 comprises a display module 7 that can be used to display a digitally encoded image on the display device 2. The display module 7 can also be used to swivel the image on the display device 2, if it is not displayed the right way round.

The control unit 4 also comprises a first delimiting module 8 for delimiting a portion of the image representing a substantially flat surface.

The control unit 4 also comprises a processing module 9, that can be used to apply a predetermined deformable geometric pattern to a delimited image portion by means of the first delimiting module 8, and that can be used to deform the geometric pattern so as to make it correspond to said image portion representing a substantially flat surface.

A determination module 10 makes it possible, to determine geometric characteristics of a surface for which said image portion has been delimited, from the deformation of the pattern.

In the description that follows, the geometric pattern is a grid. Naturally, the invention applies generally to any other geometric pattern that might be appropriate.

A selection means 11 can be used to select a coating for each surface or group of surfaces to be simulated, from the set of coatings stored in the database 5. A generation means 12 can be used to generate an image on which one or more surfaces are covered by the or each selected coating according to the geometric characteristics of the surface.

The processing means 9 can be used to apply a grid comprising a criss-cross pattern consisting of a predetermined set of rows and columns of individual squares of predetermined surface.

An indication means 13 can be used to indicate the actual size of an element of said displayed surface, according to an axis of the superimposed grid, and this for each of the two dimensions of said image portion representing said surface. In other words, according to each axis of the superimposed grid, the actual size of an element of said surface is indicated.

A second delimiting module 14 can be used to delimit one or more portions of the image corresponding to the representation of objects located in front of a surface to be simulated.

A zoom module 15 can be used to refine the delimiting of the portions of the image that correspond to the representation of objects located in front of the surface and/or the delimiting of the portion of the image representing a surface to be simulated.

An adjustment module 16 can be used to adjust the geometric patterns, namely the grids respectively superimposed on a number of portions of the image representing substantially flat surfaces. Such an adjustment makes it possible to make the different grids consistent with each other.

The system 1 also comprises a pre-display module 17 that can be used to roughly pre-display the respective positions of said delimited image portions and/or the respective positioning of the geometric patterns.

A definition module 18 can be used to define respective positions of the delimited image portions.

A grouping module 19 can be used to group or separate a number of delimited portions of the image representing substantially flat surfaces. Thus, a number of grouped image portions corresponding to a number of surfaces can be simulated covered simultaneously by one and the same selected coating.

A masking module 20 can be used to take into account the shadows and lights present on the surfaces, and to restore the shadows and lights on the generated images comprising the surfaces covered by the respective selected coatings, and this taking into account said coating.

A memorizing module 21 can be used to memorize unprocessed images, images comprising delimited portions and images with simulated surfaces covered by one or more coatings. The memorizing of such images makes it possible to avoid repeating work already done, and to compare a number of final results in order to choose the preferred result.

Figure 2:
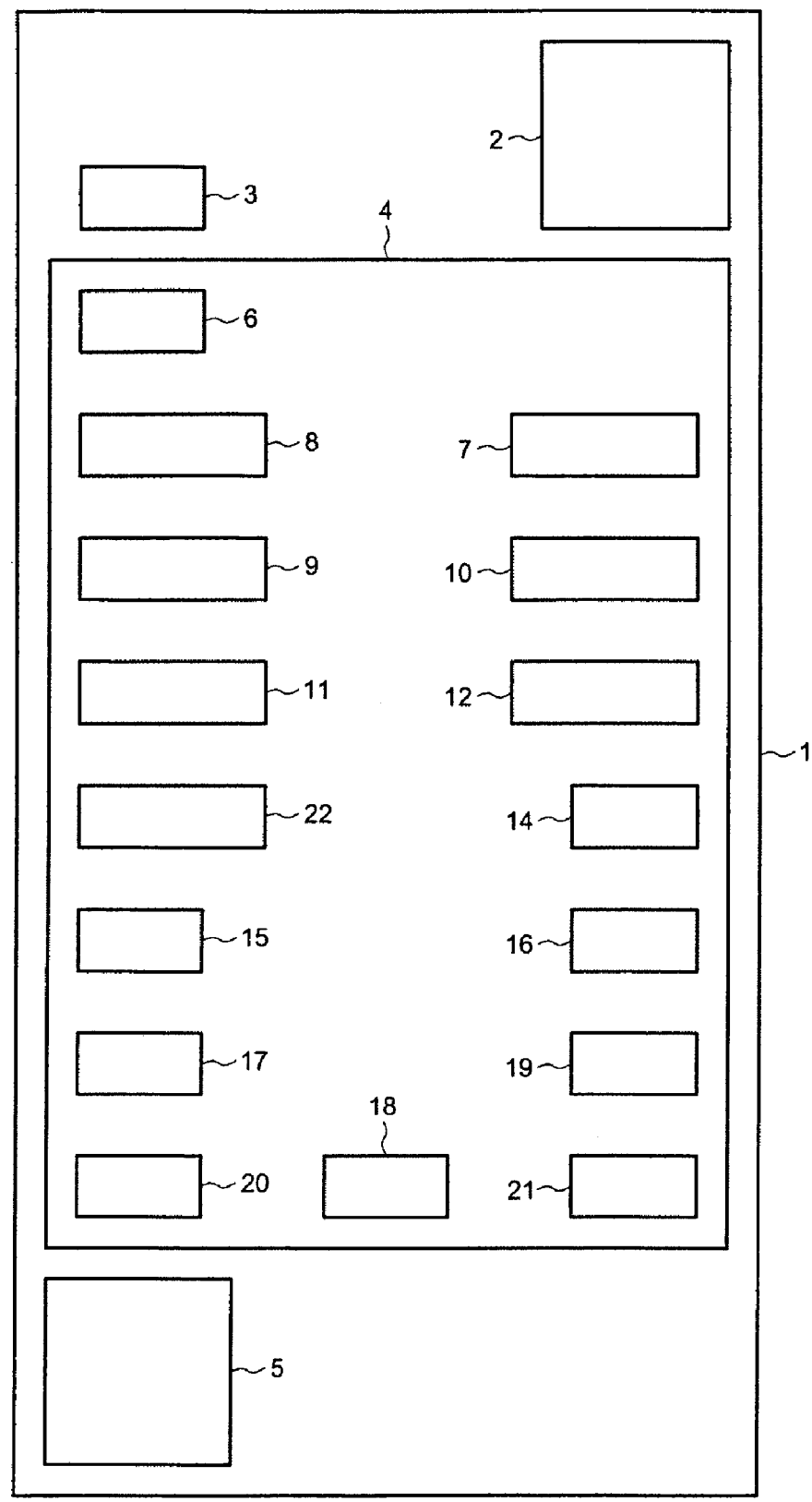
FIG. 2 is a block diagram illustrating a second embodiment of a system according to the invention.

As a variant, the system represented in FIG. 2 comprises an adaptation module 22 in place of the indication module 13.

The adaptation module 22 can be used to adapt the number of rows and columns of a grid according to the size of a side of an individual square of the grid and the dimensions of the surface corresponding to the grid.

This variant shows another way of indicating orders of size that are useful to the generation of geometric characteristics of a digitally encoded image.

Figure 3A:
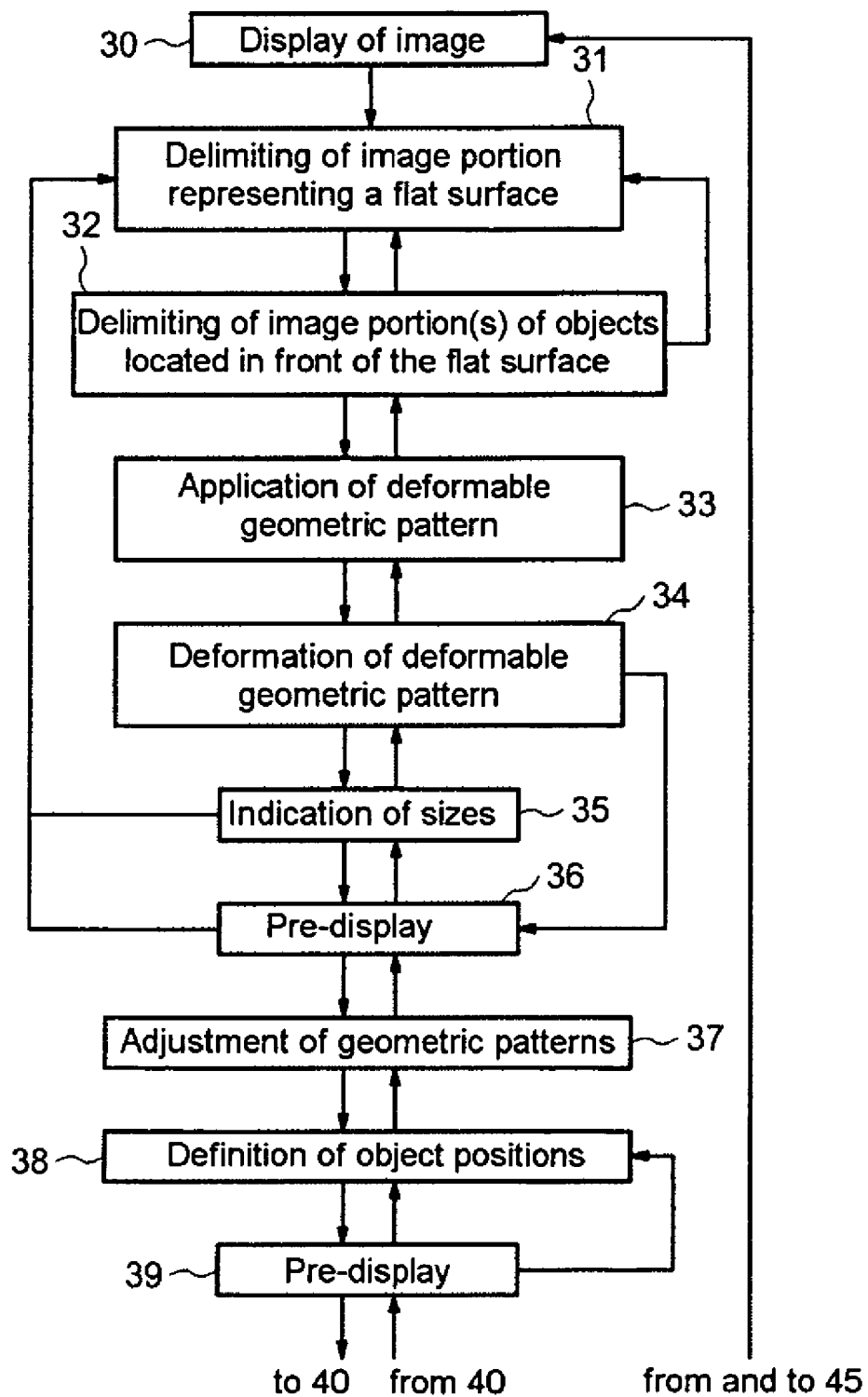

FIGS. 3*a* and 3*b* represent an exemplary implementation of the method according to one aspect of the invention.

In the application represented, it concerns enabling an operator to simulate a change of material, or colour, of a coating, paint or other of a bedroom, as much for the floor, ceiling and wall surfaces as for furniture or decoration items. In practice, furniture or decoration items can be broken down into a set of substantially flat surfaces.

Figure 5:
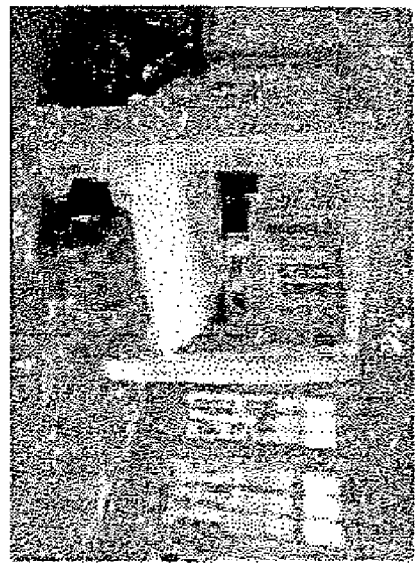
FIGS. 5 to 24 illustrate an implementation by computer of the method according to one aspect of the invention.
Figure 6:
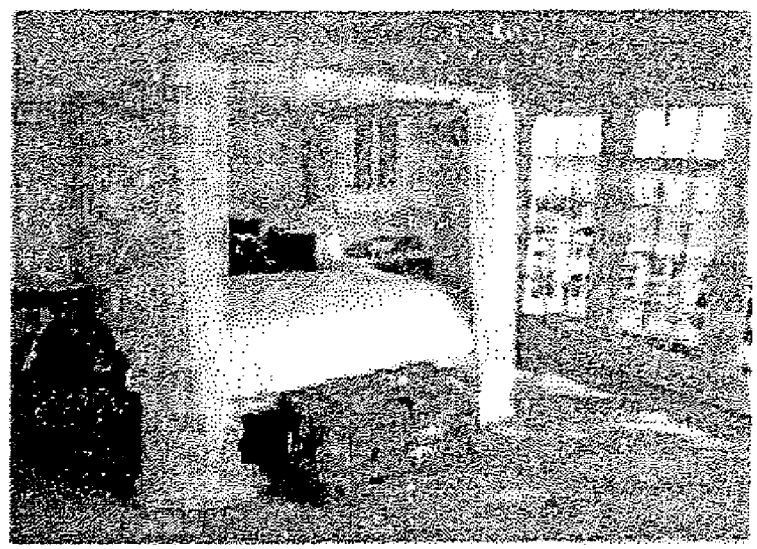

The first step is to display a digitally encoded image (step 30). During this display of an image to be processed, the image can be swivelled on the display device 2 to position it the right way round, if it is not displayed by default the right way round, according to its encoding. Such an example is illustrated in FIGS. 5 and 6. The display of the image to be processed, and its swivelling if necessary, are implemented by the display means 7 and the display device 2.

A portion of the image is delimited (step 31), representing a flat surface on which there is a desire to simulate a coating other than that actually present.

In the description that follows, it is assumed that the display device 2 is a screen, and that the module for supplying data 3 comprises a keyboard and a mouse.

Figure 7:
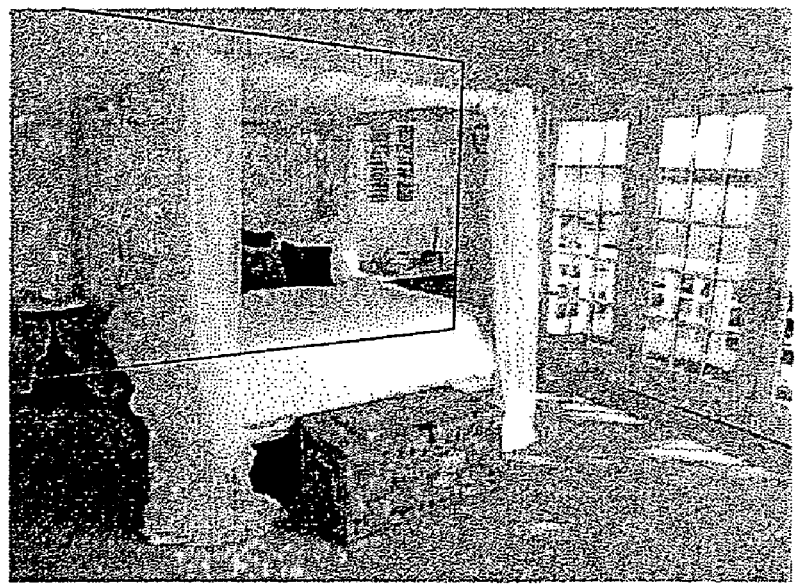
Figure 8:
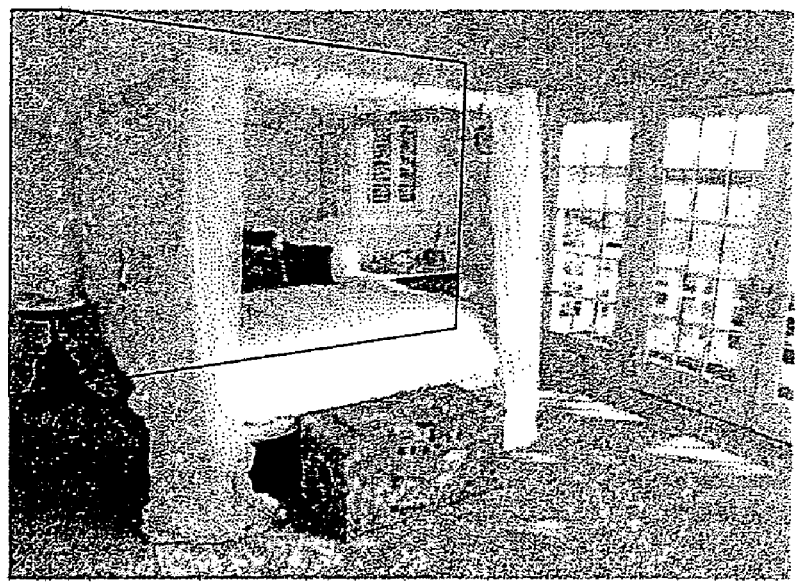
Figure 9:

The delimiting of the image portion representing a flat surface is performed using the first delimiting means 8. This delimiting is performed using the mouse 3 and the screen 2, as illustrated in FIGS. 7 and 8. During this delimiting, it is possible to use a zoom module 15 in order to refine the delimiting of the outline of the portion of the image representing the flat surface.

Figure 10:
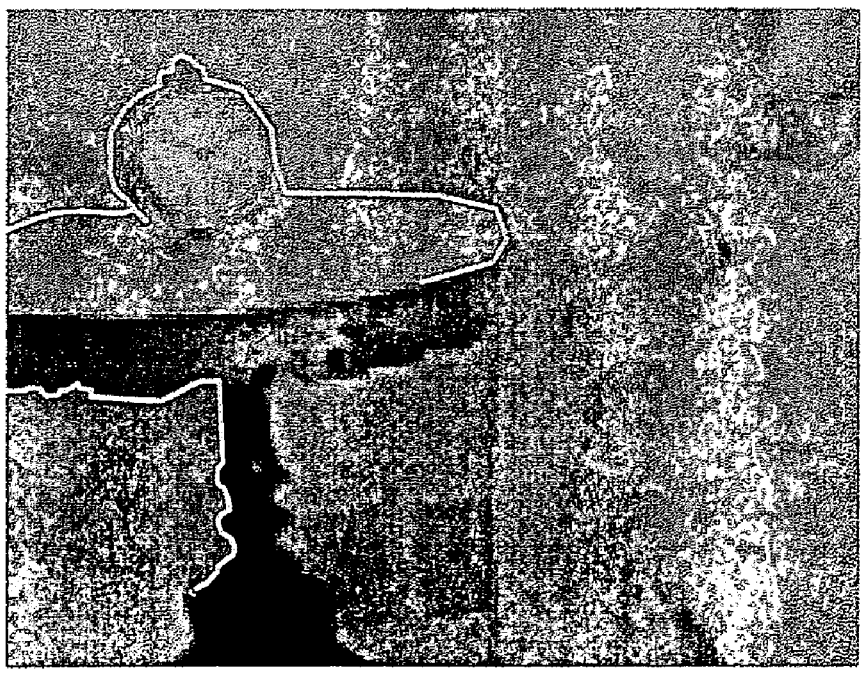
Figure 11:
Figure 12:
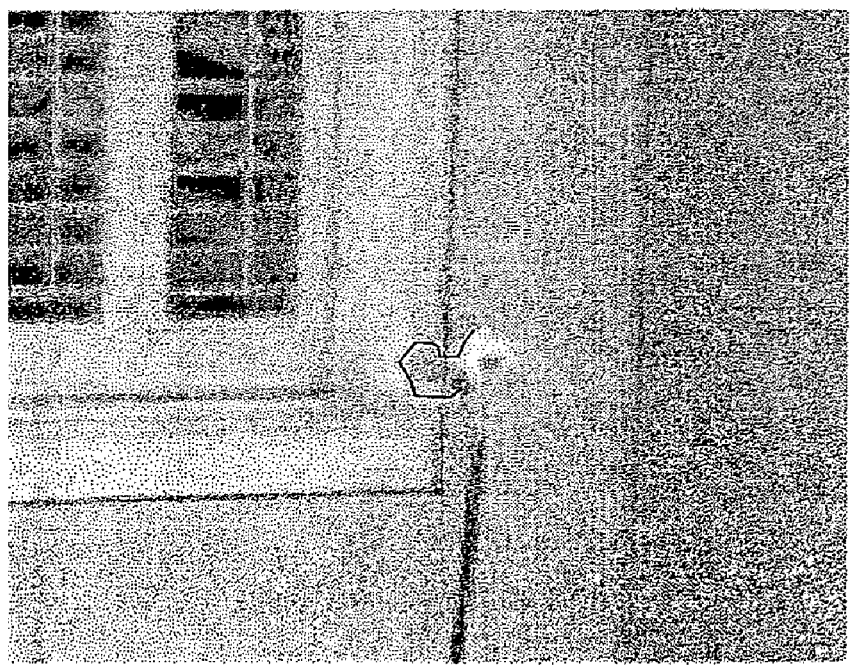
Figure 13:
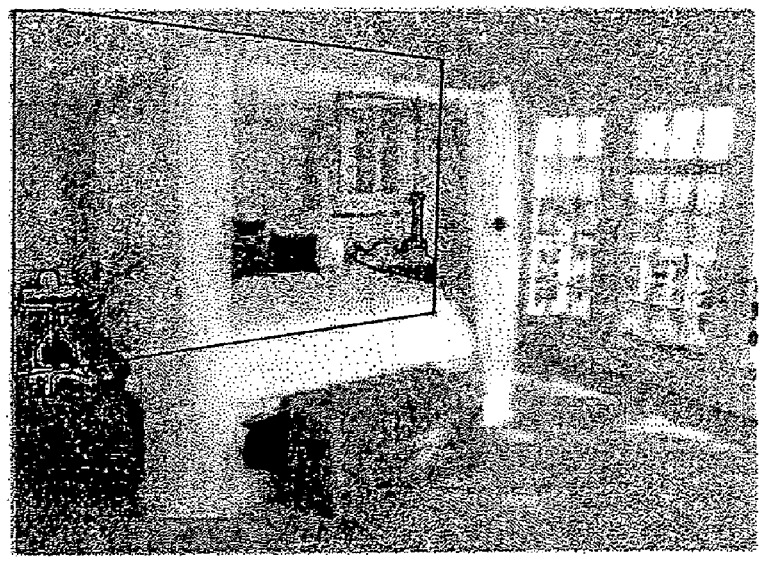

Image portions are delimited representing objects located in front of the flat surfaces that have been delimited. Such objects include, for example, an occasional table on which is placed an alarm clock, or even a window, as illustrated in FIGS. 9, 10, 11, 12 and 13. FIG. 10 illustrates the use of a zoom to delimit more accurately the objects located in front of the flat surface and to be excluded from the coating simulation. The delimiting of the image portions representing objects located in front of these flat surfaces is performed using the second delimiting module 14. The zoom is implemented by means of the zoom module 15.

Figure 14:
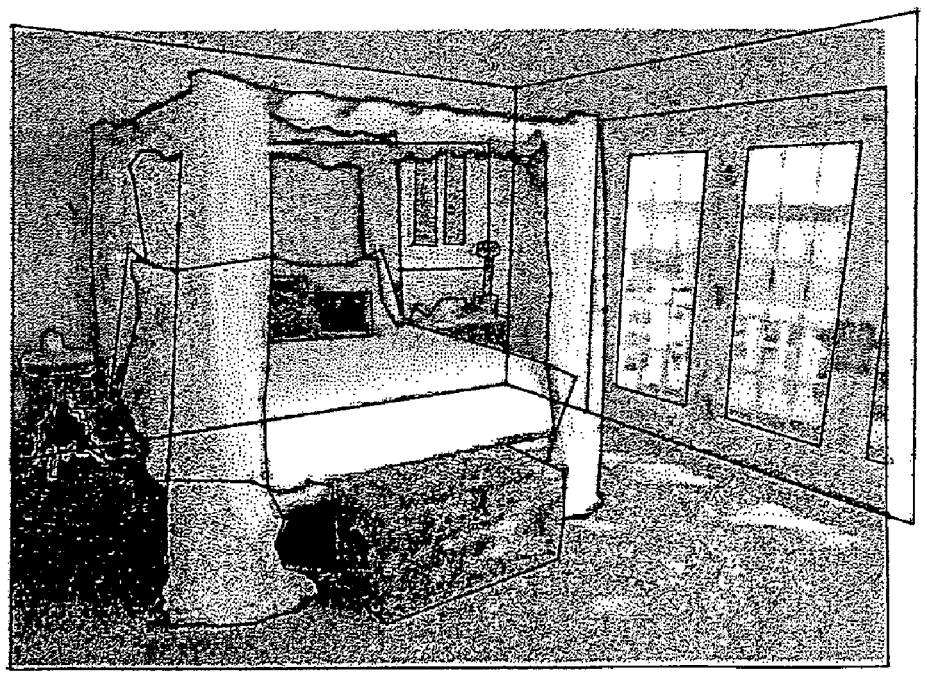
Figure 15:
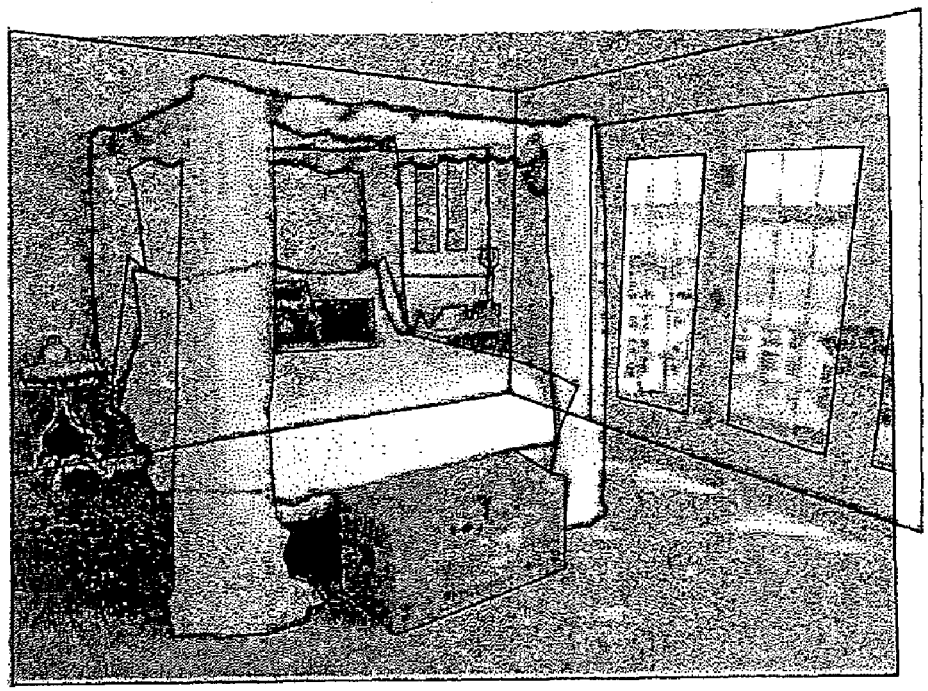

These delimitings (steps 31 and 32) of image portions are performed for all the substantially flat surfaces on which there is a desire to simulate another coating, and for all the image portions representing objects located in front of these flat surfaces to be simulated. FIGS. 14 and 15 illustrate such delimitings of image portions corresponding to flat surfaces and objects located in front of the latter. In FIGS. 14 and 15, three flat surfaces are thus delimited, two walls and a floor of a bedroom. The various objects, such as the occasional table, the bed and the trunk, which are to be excluded from the surfaces on which there is a desire to simulate another coating, appear in the display. FIG. 15 represents a refinement of the delimiting curves of FIG. 14.

A deformable geometric pattern is applied (step 33) to the delimited image portions representing a flat surface to be simulated.

Figure 16:
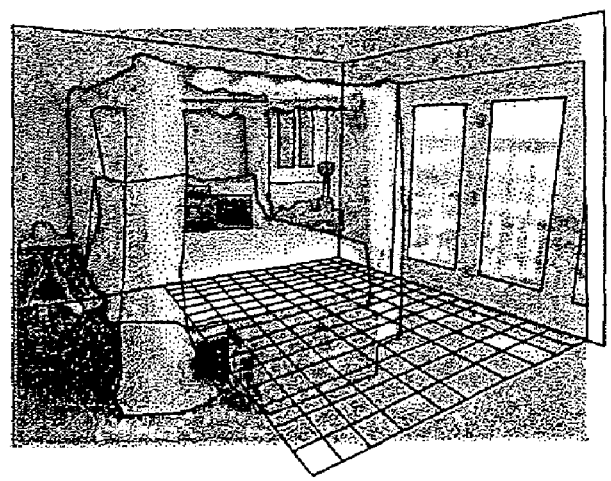
Figure 17:
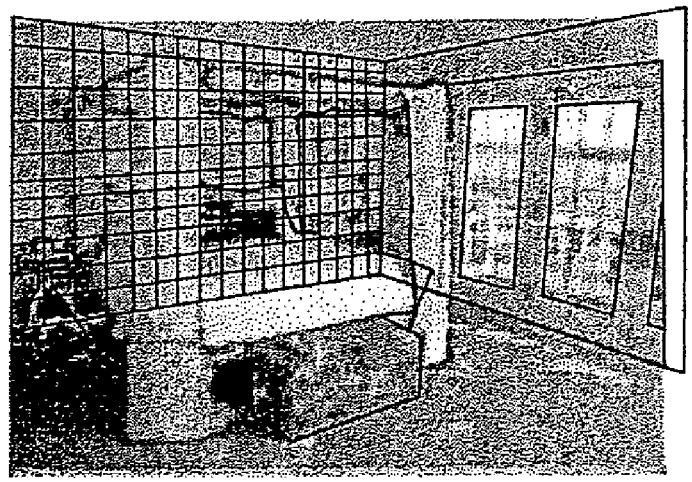

The deformable geometric pattern is deformed (step 34), in order for the grid to be superimposed on the associated image portion representing a flat surface. FIGS. 16 and 17 illustrate the application and deformation of the geometric pattern, in this case a grid, to the bedroom.

The application and deformation of the grids are performed by the processing module 9 and are intended to acquire information relating to the geometric characteristics of the grid and the deformation of the grid to make it coincide with a surface being examined.

Figure 18:
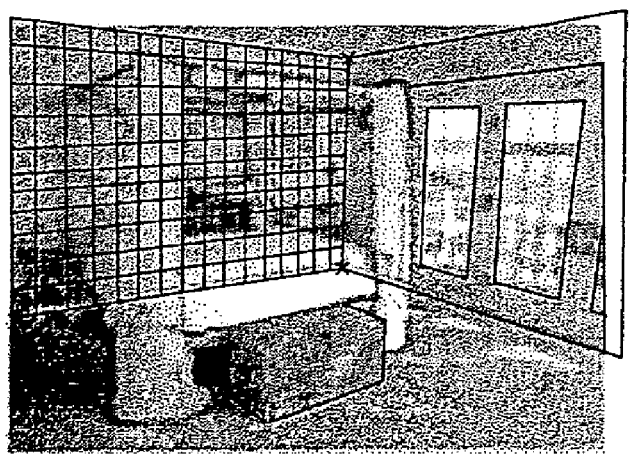
Figure 19:
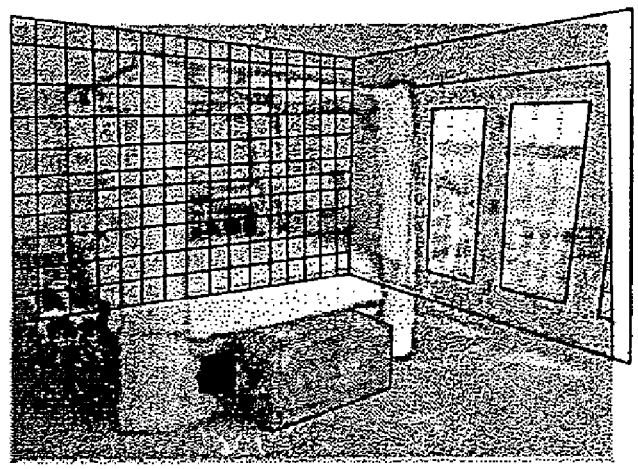

For an image portion representing a surface to be simulated, the size of an element is indicated (step 35) according to each of the two axes of the grid. In other words, for each image portion representing a surface to be simulated, it is necessary to define a height of an element and a width of an element. This size indication (step 36) is illustrated by FIGS. 18 and 19. FIG. 18 illustrates the indication of the height of the wall located behind the bed, and FIG. 19 illustrates the indication of the width of the bed. For the image portion corresponding to the surface of the wall located behind the bed, there is even indicated a height indication and a width indication. This size indication is performed for each of the image portions representing a surface to be simulated, for each axis of the grid, by the indication module 13.

Figure 20:
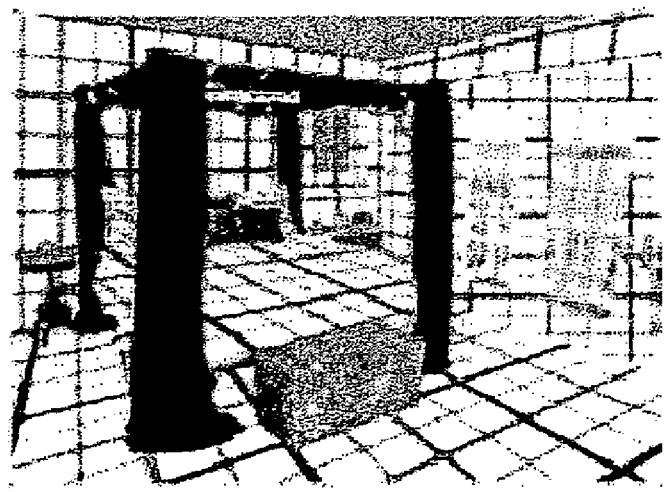

It is possible to perform a pre-display (step 36) with which to display the various grids of the image in order to check their consistency from one to the next, by means of the pre-display module 17. FIG. 20 illustrates a pre-display of the image representing the grids and objects cut out.

The grids are adjusted (step 37) between themselves. The adjustment can be done manually or automatically, by means of the adjustment module 16.

Figure 21:
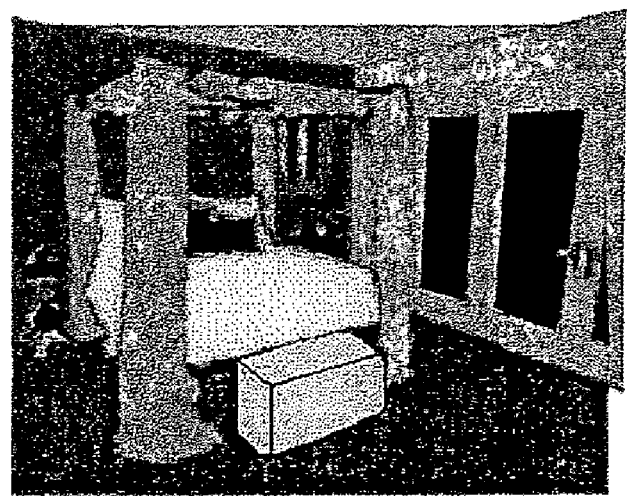

The position of the various elements corresponding to the delimited image portions is defined (step 38), as illustrated in FIG. 21, through the definition module 18.

It is possible to pre-display (step 39) the relative positions of these elements, as illustrated in FIG. 21.

Figure 22:
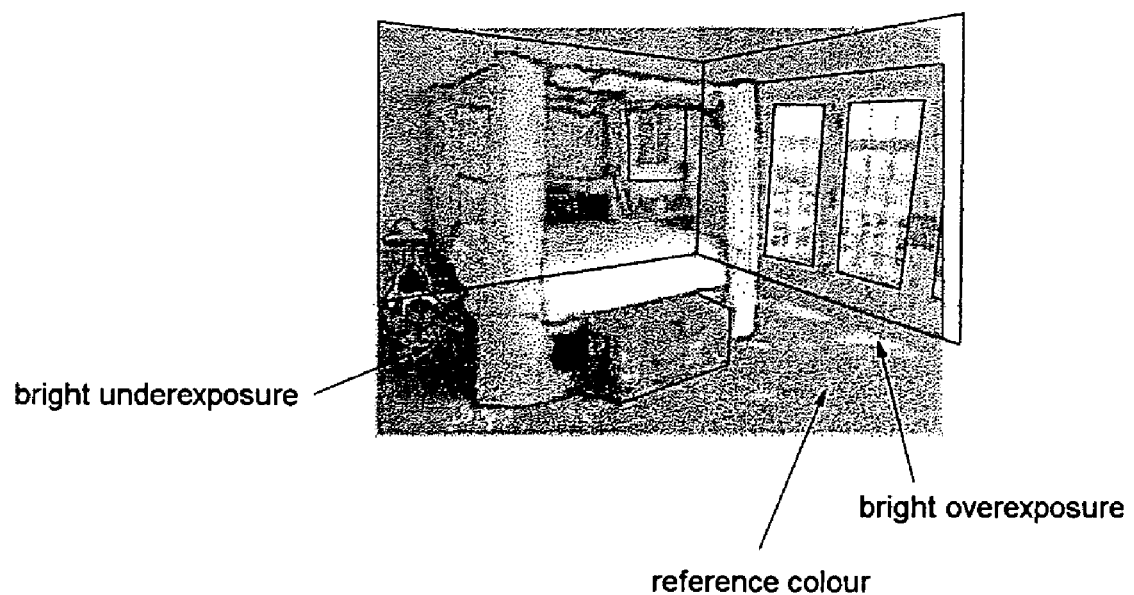

The shadows and lights are taken into account (step 40), by defining for a surface, on the image, a location of the reference colour, that is, a reference without bright underexposure or bright overexposure. The masking module 20 allows this taking into account of the plays of light on the surfaces, and for them to be extrapolated on the simulated coatings. The location of the reference colour is illustrated in FIG. 22.

The shadows and lights are taken into account, by creating a shadow mask, simultaneously using the reference colour, and a deletion, if necessary, of undesirable patterns from the photograph, for example a wallpaper pattern, by means of an image filter called a low-pass filter.

Figure 23:
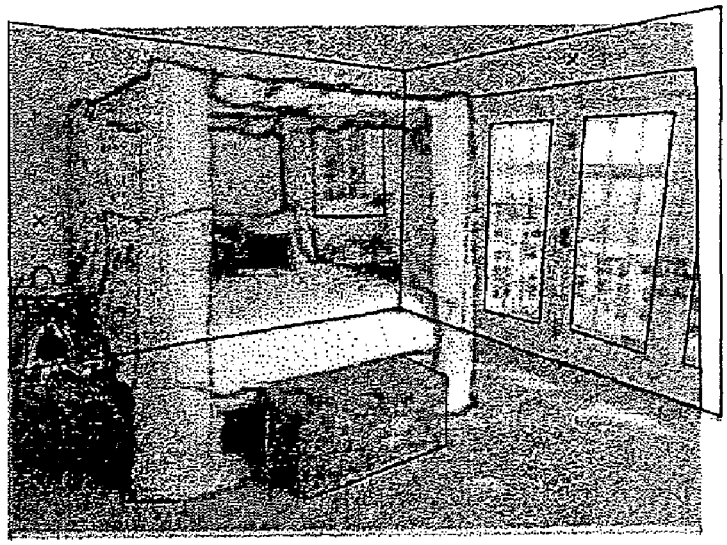

It is possible to perform a surface grouping (step 41) if there is a desire to simulate a plurality of portions of the image representing a plurality of surfaces with one and the same coating. An example of grouping of two surfaces, in this case the two walls, is illustrated in FIG. 23. The grouping module 10 can be used, via the man-machine interface module 6, the display device 7 and the computer mouse 3, to select the two surfaces to be grouped, by clicking for example at the points represented by crosses in FIG. 23, each click selecting the corresponding surface.

For each surface or group of surfaces, a coating that there is a desire to simulate is chosen (step 42), by means of the selection module 11 and the database 5.

The geometric characteristics of the different surfaces on which there is a desire to simulate a coating are determined (step 43).

Figure 24:
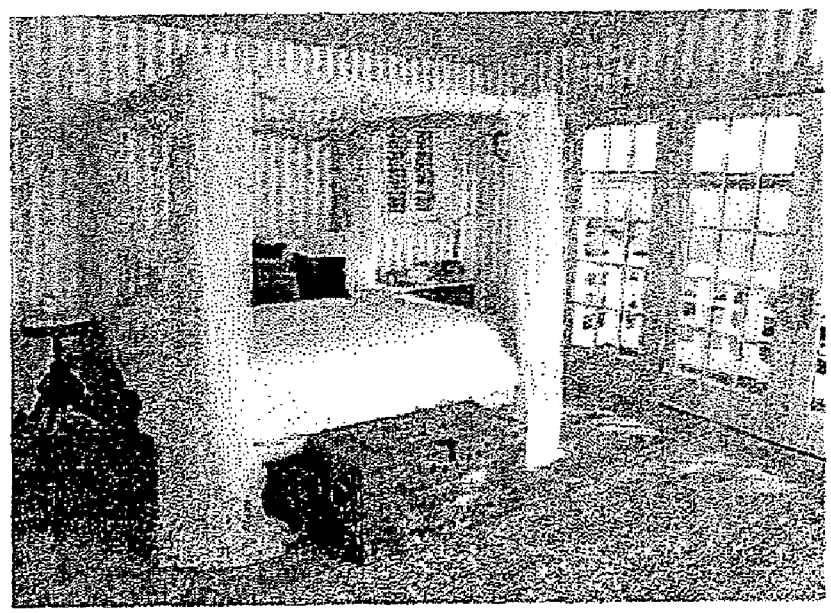

An image is generated (step 44), on which the chosen coatings have been simulated on the corresponding surfaces. FIG. 24 illustrates a simulation of the bedroom with striped wallpaper on the walls and a wood floor.

The initial, final and intermediate images are memorized (step 45) so as to be able to reuse them judiciously without having to reconstruct them.

Figure 4A:
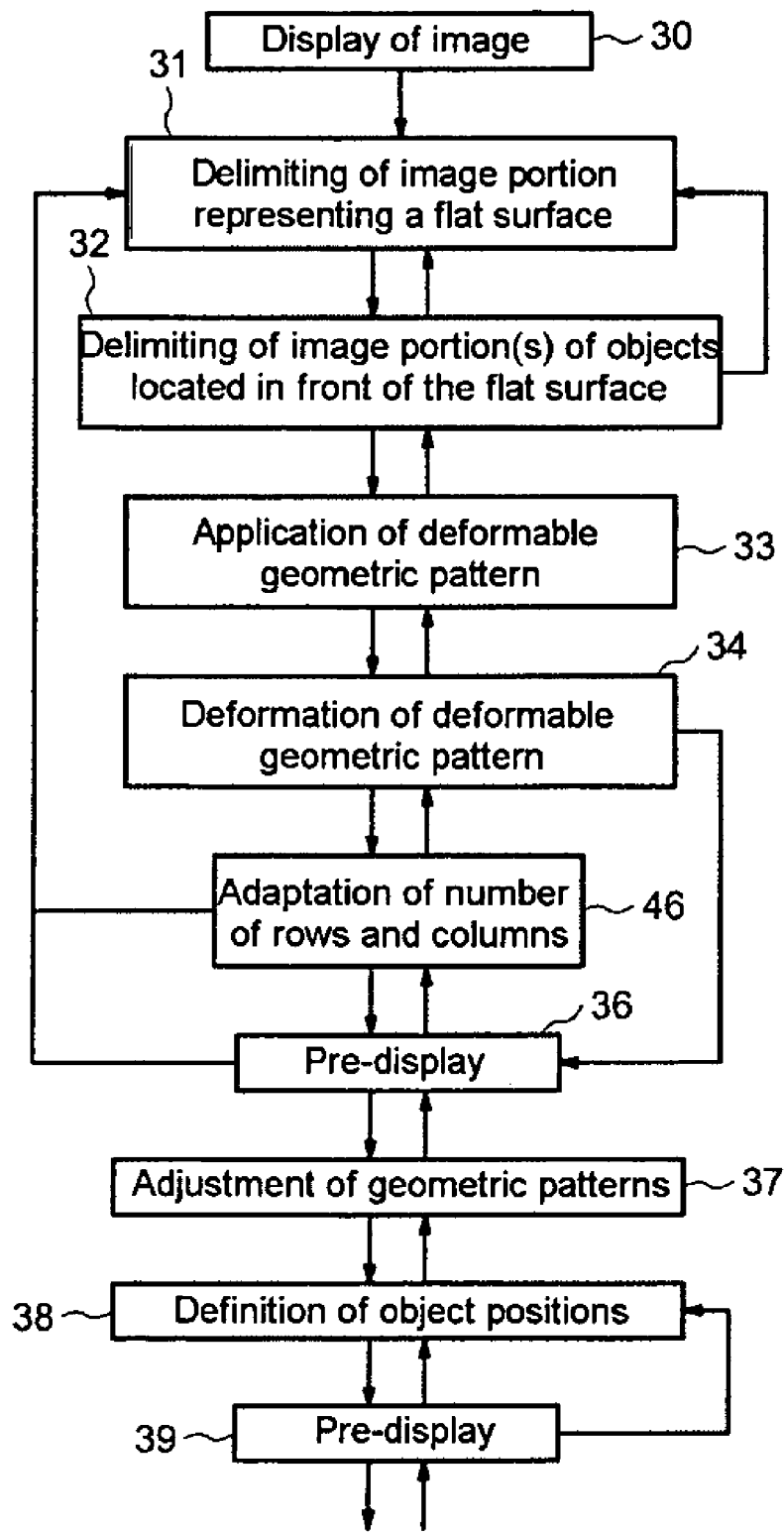

As a variant, as illustrated in FIGS. 4a and 4b, the size indication (step 35) is replaced by an adaptation (step 46) of the number of rows and columns of the grids according to the predetermined dimensions of an individual tile of the grids, in order that the predetermined surface associated with an individual tile should correspond to the surface to be simulated.

The determination and generation modules use a mapping between an actual coating tile and a tile of the grid of the image. The scale of the textures is deformed and modified, by the mapping process, as explained, for example, in the document "Perspective Mappings Between Quadrilaterals" by David Eberly, available online from http://geometrictools.com/Documentation/perspective2.pdf.

The invention makes it possible to generate geometric characteristics of a digitally encoded image, easily and without restriction for the user.

Furthermore, the invention makes it possible to simulate as many combinations of surface coatings as may be desired, in order to choose the decoration of a room or an exterior, by displaying in advance the result, which makes it possible to avoid many disappointments and regrets concerning the choice of coatings.

The invention claimed is:

1. Method of generating geometric characteristics of a digitally encoded image, comprising:
    displaying the image;
    delimiting at least a portion of the image, wherein the delimited portion represents a substantially flat surface;
    applying a predetermined deformable geometric pattern to the image in the position of the delimited image portion;
    deforming the pattern so as to make it correspond to the image portion; and
    determining geometric characteristics of the surface from the deformation of the pattern.

2. The method of claim 1, further comprising:
    selecting a coating from a set of coatings stored in a database; and
    generating an image of the surface covered by the coating according to the geometric characteristics of the surface.

3. The method of claim 1, wherein the pattern is a grid comprising a criss-cross pattern of a predetermined set of rows and columns of individual squares of predetermined surface.

4. The method of claim 3, wherein for each of the two directions of the image portion representing the surface, the actual size of an element of the surface displayed according to an axis of the grid superimposed is indicated.

5. The method of claim 3, further comprising adapting the number of rows and columns of the grid according to the size of a side of an individual square of the grid and the dimensions of the surface.

6. The method of claim 1, further comprising delimiting one or more portions of the image corresponding to the representation of objects located in front of the surface.

7. The method of claim 6, wherein delimiting the image comprises using a zoom to refine the delimiting of the portions of the image corresponding to the representation of the objects located in front of the surface and/or the delimiting of the portion of the image representing the surface.

8. The method of claim 7, comprising adjusting the geometric patterns respectively superimposed on a plurality of portions of the image representing substantially flat surfaces.

9. The method of claim 6, further comprising pre-displaying the respective positions of the delimited image portions and/or the respective positioning of the geometric patterns.

10. The method of claim 6, further comprising defining the respective positions of the delimited image portions.

11. The method of claim 2, further comprising grouping a number of delimited portions of the image representing substantially flat surfaces to generate an image of the grouped surfaces covered simultaneously by one and the same selected coating.

12. The method of claim 1, further comprising accounting for the shadows and lights present on the surfaces; and restoring the shadows and lights on the generated images comprising the surfaces covered by respective coatings, taking into account the coating.

13. The method of claim 12, further comprising memorizing unprocessed images, images comprising the delimited portions and images with simulated surfaces covered by a coating.

14. A computer program stored on a data storage medium, characterized in that it comprises instruction codes suitable for implementing, when executed in a computation module, the method comprising:
    displaying an image;
    delimiting at least a portion of the image, wherein the delimited portion represents a substantially flat surface;
    applying a predetermined deformable geometric pattern to the image in the position of the delimited image portion;
    deforming the pattern so as to make it correspond to the image portion; and
    determining geometric characteristics of the surface from the deformation of the pattern.

15. A system of generating geometric characteristics of a digitally encoded image comprising:
    a display device capable of displaying a digitized image, communicating with a control unit, and comprising a man-machine interface and means of supplying data to the system via the man-machine interface comprising:
    a display means for displaying a digitally encoded image on the display device;
    a first delimiting means for delimiting a portion of the image representing a substantially flat surface;
    a processing means for applying a predetermined deformable geometric pattern to the image in the position of the delimited image portion and deforming the pattern so as to make it correspond to the image portion; and
    a determination means for determining geometric characteristics of the surface from the deformation of the pattern.

16. The system of claim 15, further comprising a selection means for selecting a coating from a set of coatings stored in a database, and a generation means for generating an image of the surface covered by the coating according to the geometric characteristics of the surface.

17. The system of claim 15, wherein the processing means is suitable for applying a grid comprising a criss-cross pattern made up of a predetermined set of rows and columns of individual squares of predetermined surface.

18. The system of claim 17, further comprising an indication means for indicating the actual size of an element of the surface displayed according to an axis of the superimposed grid, for each of the two dimensions of the image portion representing the surface.

19. The system of claim 17, further comprising an adaptation means for adapting the number of rows and columns of the grid according to the size of a side of an individual square of the grid and the dimensions of the surface.

20. The system of claim 15, further comprising a second delimiting means for delimiting one or more portions of the image corresponding to the representation of objects located in front of the surface.

21. The system of claim 20, further comprising a zoom means for refining the delimiting of the portions of the image corresponding to the representation of the objects located in front of the surface and/or the delimiting of the portion of the image representing the surface.

22. The system of claim 15, further comprising an adjustment means for adjusting the geometric patterns respectively superimposed on a plurality of portions of the image representing substantially flat surfaces.

23. The system of claim 20, further comprising a pre-display means for pre-displaying the respective positions of the delimited image portions and/or the respective positioning of the geometric portions.

24. The system of claim 23, further comprising a means of defining respective positions of the delimited image portions.

25. The system of claim 16, further comprising a grouping means for grouping a number of delimited portions of the image representing substantially flat surfaces, the generation means being capable of generating an image of the grouped surfaces simultaneously covered by one and the same selected coating.

26. The system of claim 15, further comprising a masking means for taking into account the shadows and lights present on the surfaces, and restoring the shadows and lights on the generated images comprising the surfaces covered by respective coatings, taking into account the coating.

27. The system of claim 15, further comprising a memorizing means for memorizing unprocessed images, images comprising the delimited portions and images with simulated surfaces covered by a coating.

\* \* \* \* \*